No. 859,401. PATENTED JULY 9, 1907.
W. G. MEIN & E. GAMINARA.
CASTER.
APPLICATION FILED NOV. 1, 1905.

Witnesses:
Louise H. Staaden.
Frances Farrell.

Inventors:
William George Mein
and Ernest Gaminara

UNITED STATES PATENT OFFICE.

WILLIAM GEORGE MEIN AND ERNEST GAMINARA, OF LONDON, ENGLAND.

CASTER.

No. 859,401.

Specification of Letters Patent.

Patented July 9, 1907.

Application filed November 1, 1905. Serial No. 285,469.

*To all whom it may concern:*

Be it known that we, WILLIAM GEORGE MEIN, a subject of His Majesty the King of Great Britain, residing at and whose post-office address is 168 Upton Lane, Forest Gate, London, England, and ERNEST GAMINARA, a subject of His Majesty the King of Great Britain, residing at and whose post-office address is 17 Cranmer Road, Forest Gate, London, England, have invented certain new and useful Improvements in Casters, of which the following is a specification.

This invention concerns an improved method and means for readily and efficiently securing a center bearing, ball guided spindle in a caster frame without the use of screws, and with a great saving in time, labor and cost of production.

Figure 1:
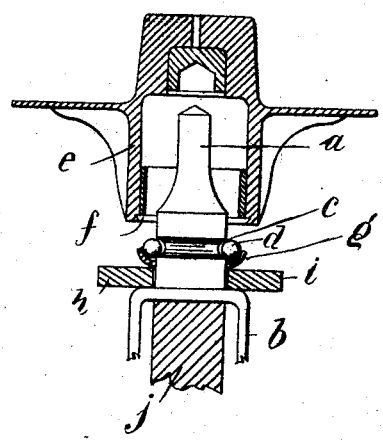
Figure 2:
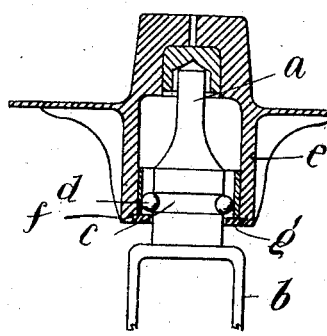
Figure 3:
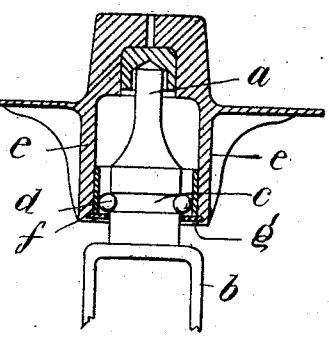

Referring to the accompanying drawings:— Figure 1 is a sectional view of a caster and shows the spindle in the act of being secured thereto. Figs. 2 and 3 are sectional views of completed casters, the latter figure showing a slightly modified securing means to the former.

In the type of caster to which the invention refers, the spindle $a$ and fork $b$ are arranged integral or in fixed connection with each other, and the spindle is provided with a groove $c$ in which work a set of balls $d$.

This invention consists therein that in the lower part of the caster socket $e$ is formed an annular groove or recess $f$. As shown in Figs. 1 and 2 such groove $f$ is of angular shape in cross section, but as shown in Fig. 3, a U shaped groove may be employed.

A dished washer $g$ having a beveled outer periphery for the groove $f$ Fig. 1 is passed over the spindle $a$, such washer $g$ being of such size that when flattened out it may tightly fit into and firmly engage said groove $f$. By reason of the washer $g$ being so dished, the balls $d$ may be placed thereon and supported thereby while the spindle $a$ is inserted in the caster socket $e$.

To fix the spindle to the caster socket, thickness pieces $h$, $i$, are located between the washer $g$ and the top of the fork $b$ as at Fig. 1, and a press block $j$ is brought to bear on the fork with sufficient force to press the washer $g$ into the groove $f$ as at Fig. 2, thereby securing the washer and also the spindle to the caster socket, as the size of the washer $g$ is such that the inner portion thereof projects sufficiently beyond the balls $d$ working in the groove $c$ as to hold up the spindle.

Fig. 3 shows a spindle and caster socket similarly connected as before described. In this case a plain ordinary groove $f$ is made in the lower part of the socket. This form of groove is not however so desirable as that shown in Figs. 1 and 2, as the lower face of the washer $g$ cannot be arranged to come flush with the lower edge of the caster socket.

By a construction of caster substantially as hereinbefore described, the disadvantages avoiding the commercial success of ball bearing casters are entirely obviated. Such or the principal disadvantages of ball bearing casters have been that, firstly; the assembling of the parts especially the balls occupied too long a time; secondly; when assembled some means as a pin or screw passing through the spindle or a retaining plate attached to the bottom of the caster socket by screws had to be provided. This has meant a high cost of manufacture, and as the spindle and fork of the known types of caster having had to be made in two separate parts, the neck of spindle and fork has proved a source of weakness.

By the construction according to this invention, not only can the spindle and fork be stamped in one piece, (an important consideration) but the dished washer $g$ forms a receptacle for the balls while the caster socket is located over the spindle and the washer pressed home into the groove $f$. In this way the assembling of the parts is effected in a minimum of time and by unskilled labor, and by the balls fitting in the annular groove of the spindle and the inner wall of the washer projecting beneath the balls, the spindle $a$ is held in the socket $e$ by the washer without the use of pins, screws, or the like.

Having thus described our invention, we declare that what we claim and desire to secure by Letters Patent is:—

1. In a caster having a center bearing and ball guided spindle as set forth, the combination with a socket provided with an annular recess in the lower part thereof and a spindle provided with an annular groove forming a ball race, of means for holding balls round the spindle while assembling the spindle, balls and socket, and for forming the cover and fastening means for the socket and spindle, said means comprising a dished ring adapted to be placed over the spindle and when filled with balls pressed flat into the recess of said socket, substantially as herein described.

2. A caster comprising a socket provided with an annular recess in the lower part thereof, a center bearing spindle carrying a fork and roller and provided with an annular groove forming a ball race, balls located in said race and a ring adapted to be placed over the spindle, said ring being dished for the double purpose of holding the balls round said spindle during assembling of the spindle, balls and socket, and for entering the annular recess in said socket to be pressed flat to engage said recess, substantially as herein described.

3. A caster comprising a socket provided with an annular recess of angular shape in cross-section in the lower part thereof, a center bearing spindle carrying a fork and roller, and provided with an annular groove forming a ball race, balls located in said race and a ring adapted to be placed over the spindle, said ring being dished for the double purpose of holding the balls round said spindle during assembling of the spindle, balls and socket, and for entering the annular recess in said socket to be pressed flat to engage said recess, substantially as herein described.

In witness whereof we have hereunto set our hands in presence of two witnesses.

WILLIAM GEORGE MEIN.
ERNEST GAMINARA.

Witnesses:
HENRY CONRAD HEIDE,
ALBERT GEORGE BARNES.